United States Patent Office 2,854,886
Patented Oct. 7, 1958

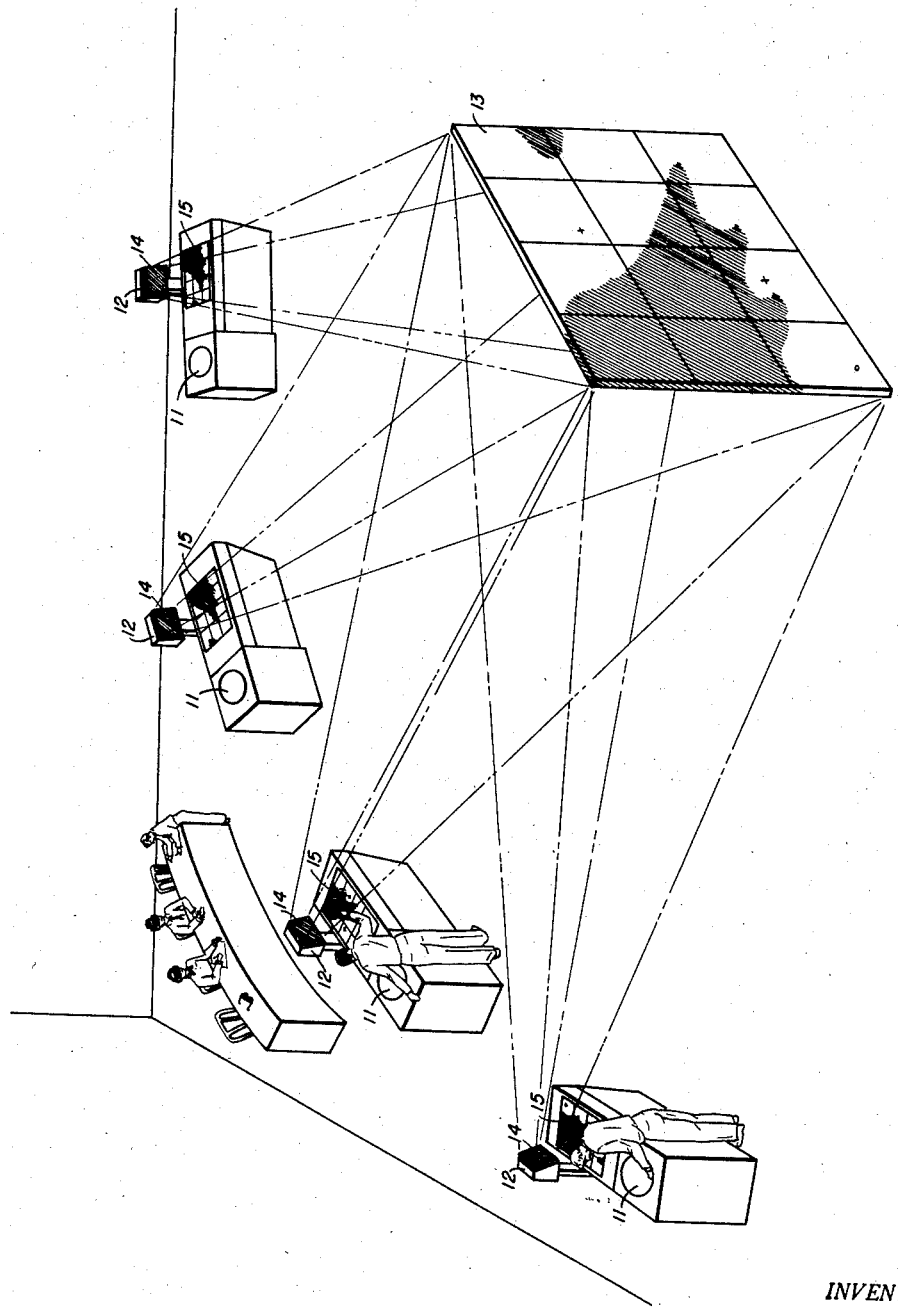

2,854,886
SYSTEM FOR VIEWING AND PLOTTING TARGETS FROM RAPIDLY CHANGING DATA

John M. Stroud, San Diego, Calif.

Application August 25, 1955, Serial No. 530,648

3 Claims. (Cl. 88—24)

(Granted under Title 35, U. S. Code (1952), sec. 266)

The invention described herein may be manufactured and used by or for the Government of the United States of America for governmental purposes without the payment of any royalties thereon or therefor.

This invention relates to a system of visual memory and more particularly to an improved system of plotting targets from rapidly changing data.

Heretofore two major plotting systems have been used. In one a bottom lighted sheet with earth centered coordinates and a mechanical indicator of ship's position was used for surface plotting. In the second system an edge lighted transparent plastic plotter was used for air contacts with ship centered and earth orientated coordinates. In both systems data was transmitted by voice to the plotters.

Not only were these systems susceptible to plotting errors inherent with voice communication but the plotting was slow and not easily adapted to many fast moving targets. Several plotters must be assigned to each plotter with subsequent crowding and confusion.

Under the plotting system of the present invention, the plotting information is optically transmitted to the plotting board from projectors placed in proximity with the detection equipment operators. There is no physical plotting on the plotting board or screen itself. Equipment used in practicing this system includes a large translucent or reflecting screen to which all plots are projected in the same scale and on the same coordinates. Each plot is executed by making light transmitting marks on a back lighted opaque film over each of the projectors. Each plot may be distinguished by being illuminated by a narrow band of visible light established by an interference or color type filter. Each viewing officer is provided with matching filters and especially designed wide band pass viewing filters so that he may view any one projected plot or predetermined group of plots without interference from the other projected plots.

The advantages of this system include the handling of more plots with greater speed and accuracy and with less confusion. It provides for permanent records of plots for training and analysis purposes and provides for selective comparisons of desired plots and selective rejection of unwanted data.

An object of this invention is the provision of an improved system of projection plotting targets.

Another object is the provision of a system of plotting targets quickly and accurately by means of optical projection from the target detection source.

Another object is the provision of narrow band optical projection of data and narrow band and broad band pass filtering for selectively tracking desired classes or groups of targets and excluding unwanted data plotted for use for other functions.

Other objects and many of the attendant advantages of this invention will be readily appreciated as the same becomes better understood by reference to the following detailed description when considered in connection with the accompanying drawings wherein the single figure illustrates schematically the system of optical projection practiced in this invention.

Referring now to the drawing, detection devices 11 such as radar, sonar or other range and/or bearing indicating devices are spaced conveniently in the Command Intelligence Center. In close proximity to each device 11 is a light projector 12 for projecting light to a common screen 13 of either translucent, reflecting or opaque material. Although many projectors are satisfactory, the type commonly known as overhead projectors are easily adapted for use and are very convenient in operation since they have a surface adapted for illustration and project such illustration on a screen. Each projector has a narrow band light interference filter 14 which passes light of only one color, for example, red, blue, green or yellow. The illustration surface of each projector is covered with an opaque film upon which light transmitting marks may be made with a hand stylus. All plots are projected in the same scale and on the same coordinates. The preferred coordinates are ship-centered, earth oriented and motion of Own Ship is also plotted for orientation purposes. The plotting board or screen 13 may have the coordinates painted thereon or they may be projected from one of the projectors 12. Geographical information may be projected by either a varifocal projection of a standard chart or from a prepared scaled outline. Each projector is focused and trained so that the coordinates are the same for all projectors.

As aforestated, the plot from each projector 12 is distinguished by illumination by a narrow band of visible light established by an interference type filter 14. Each viewing officer is provided with matching filters and especially designed wide band pass filters so that he may view any one plot or predetermined group of plots without intereference from the other plots. For exemplary purposes, assume the four filters 14 pass red, blue, green and yellow light respectively. The "red" detection-plotter might be assigned the duty of tracking and plotting surface vessels, the "blue" operator the duty of plotting known friendly flights of aircraft assigned to a local group, the "green" operator may be charged with unidentified or "bogey" aircraft and the "yellow" operator in charge of sub-surface detection and plotting. As each target is detected, the operator will scratch through the opaque film 15 on his projector 12 with a hand stylus and make suitable symbols at the range and bearing of the target. Time, type, speed and other information can be inscribed and projected to the main screen 13 as desired. The viewing officers, by selection of suitable band pass filters can read red, blue, green or yellow information, as desired, or can view the composite picture of all information. The film 15 makes a permanent record for later study and analysis.

From the above description numerous modifications will readily occur to those skilled in the art. By arranging the detection-plotters in a circle around the projection screen on the deck below, as many as twenty-five plotters can project to the main screen. If more are required, two decks of plotters can be used. The viewing officers may be stationed on either side of the screen. Where data is plotted from radar, the range and bearing controls of the presentation system could have coupled to them an automatic range and bearing marker on the plotting surface of the projector to avoid possible human error in reading and translating dial settings and positions. Since the form of the invention here shown is illustrative only, and since other modifications will suggest themselves from time to time, it should be understood that alterations may be made without departing from the spirit and the scope of the invention as set forth in the appended claims.

What is claimed is:

1. A system for viewing and plotting targets from rapidly changing target data comprising a display screen, a plurality of back lighted opaque film means each having light transmitting geographical and coordinate plot representations thereon, a plurality of target detection and indicating means each being positioned in close proximity to one of said opaque film means for providing rapidly changing target data, means for producing light transmitting marks indicative of said target data on selected portions of each of said opaque film means, a plurality of light projection means each having selective light filter means positioned at its projection aperture for selectively projecting images of said representations and marks on each of said oqaque film means on said display screen, and band pass viewing filter means for each of a plurality of observers for observing a preselected group of said images on said screen without interference from other groups of images on said screen.

2. In a system as in claim 1, in which said display screen is of translucent material and said band pass viewing filter means comprises light filter means spaced from said screen on the opposite side thereof from said projection means.

3. In a system as in claim 1, in which said display screen is of reflecting material and said band pass viewing filter means comprises light filter means spaced from said screen on the same side thereof as said projection means.

References Cited in the file of this patent

UNITED STATES PATENTS

| | | |
|---|---|---|
| 1,319,820 | Williams | Oct. 28, 1919 |
| 1,545,674 | MacKay | July 14, 1925 |
| 2,330,799 | Coker et al. | Oct. 5, 1943 |
| 2,406,451 | Borkenstein | Aug. 27, 1946 |
| 2,413,300 | Dunn et al. | Dec. 31, 1946 |
| 2,421,077 | Miller | May 27, 1947 |
| 2,457,170 | Mitchell | Dec. 28, 1948 |
| 2,505,793 | Rust et al. | May 2, 1950 |
| 2,581,358 | Busignies et al. | Jan. 8, 1952 |
| 2,608,094 | Best | Aug. 26, 1952 |
| 2,714,199 | Adams et al. | July 26, 1955 |
| 2,714,330 | Frederickson | Aug. 2, 1955 |